United States Patent
Bakker et al.

(10) Patent No.: US 7,514,888 B2
(45) Date of Patent: Apr. 7, 2009

(54) METHOD AND SYSTEM FOR SENSORLESS BRUSHLESS DC MOTOR CONTROL WITH PREDICTIVE SWITCH TIMING

(75) Inventors: Anthonius Bakker, Morgan Hill, CA (US); Navdeep Singh Dhanjal, San Jose, CA (US)

(73) Assignee: Analog Devices, Inc., Norwood, MA (US)

( * ) Notice: Subject to any disclaimer, the term of this patent is extended or adjusted under 35 U.S.C. 154(b) by 405 days.

(21) Appl. No.: 11/555,574

(22) Filed: Nov. 1, 2006

(65) Prior Publication Data

US 2008/0101776 A1    May 1, 2008

(51) Int. Cl.
*H02P 6/18* (2006.01)
(52) U.S. Cl. .................. 318/400.34; 318/459; 318/500; 318/400.32
(58) Field of Classification Search .................. 318/459, 318/500, 400.32, 400.34
See application file for complete search history.

(56) References Cited

U.S. PATENT DOCUMENTS

| | | | |
|---|---|---|---|
| 5,859,520 A * | 1/1999 | Bourgeois et al. ........... | 318/805 |
| 6,949,900 B1 * | 9/2005 | Berringer ................ | 318/400.03 |
| 2003/0231875 A1 * | 12/2003 | Masino .................... | 388/928.1 |
| 2005/0225272 A1 * | 10/2005 | Wu et al. ..................... | 318/254 |

OTHER PUBLICATIONS

AVR440: Sensorless Control of Two-Phase Brushless DC Motor; ATMEL; Sep. 2005, pp. 1-16.

* cited by examiner

*Primary Examiner*—Rina I Duda
(74) *Attorney, Agent, or Firm*—Koppel, Patrick, Heybl & Dawson

(57) ABSTRACT

A method and system for providing sensorless brushless DC motor control using predictive switch timing requires connecting a stator coil in a bridge configuration, applying a positive excitation voltage across the coil for a predetermined time period, deactivating the excitation voltage, and monitoring the voltage ($V_{EMF}$) generated due to electro-motive force (EMF) across the coil. The polarity of $V_{EMF}$ changes when the rotor has moved a known distance—typically 90°. After detecting a polarity change, a negative excitation voltage is applied across the coil, deactivated, and $V_{EMF}$ monitored to detect a polarity change. This sequence is repeated to maintain the rotation of the rotor. The motor is preferably set into motion using a start-up routine, which also determines the predetermined time period used during steady-state operation.

35 Claims, 6 Drawing Sheets

METHOD AND SYSTEM FOR SENSORLESS BRUSHLESS DC MOTOR CONTROL WITH PREDICTIVE SWITCH TIMING

BACKGROUND OF THE INVENTION

1. Field of the Invention

This invention relates generally to the field of motors, and more particularly, to circuits and methods for determining the position of a brushless DC motor's rotor.

2. Description of the Related Art

Brushless DC motors generally comprise a stator and a permanent magnet rotor. The stator includes at least one coil; an excitation voltage is periodically applied across the coils, and the resulting electromagnetic field causes the rotor to rotate with respect to the stator.

To ensure that the application of the excitation voltage is correctly timed, it is necessary to know the position of the rotor with respect to the stator coils. This is conventionally accomplished with the use of one or more Hall effect sensors, with the stator coils activated by drive electronics that are cued by signals received from the sensors. One motor system of this type is illustrated in FIG. 1. Here, a motor 10 includes stator coils 12 and 14 and a Hall sensor 16. A controller 18 operates switches 20 and 22, here bipolar transistors, to periodically apply an excitation voltage VDD across coils 12 and 14, respectively. The position of the rotor is sensed with Hall sensor 16, and reported to controller 18 via an amplifier 20; with this position information, controller 18 can operate switches 20 and 22 as necessary to maintain the rotation of the motor's rotor, and to control its speed if desired.

However, the approach depicted in FIG. 1 has a number of drawbacks. The need for Hall sensors contributes a significant cost to the motor. In addition, the sensors must be placed within the motor along with other electronics, which limits the design of the motor structure, and may degrade its reliability.

One alternative to the use of Hall sensors is employed in some multiple-phase DC brushless motors. Here, the electromotive force (EMF) generated in a passive coil while another coil is energized is measured and used to determine the position of the rotor.

SUMMARY OF THE INVENTION

A method and system for providing sensorless brushless DC motor control using predictive switch timing are presented which overcome the problems noted above, providing accurate rotor position information without the need for Hall sensors or a passive coil.

The present method determines the position of a brushless DC motor's permanent magnet rotor by applying an excitation voltage having a first polarity across at least one stator coil for a predetermined ON-time period, deactivating the excitation voltage, monitoring the voltage ($V_{EMF}$) across the coil generated by the electro-motive force (EMF) induced by the motor's rotor when the excitation voltage is deactivated, and detecting when $V_{EMF}$ changes polarity. The polarity of $V_{EMF}$ changes when the rotor has moved by a known distance which depends on the number of rotor poles. The stator coil is connected in a full-bridge configuration. This arrangement enables the excitation voltage to be applied and the $V_{EMF}$ polarity to be monitored across the same coil.

To keep the rotor spinning, after detecting that $V_{EMF}$ has changed polarity, an excitation voltage having a polarity opposite that of the first polarity is applied across the coil for a predetermined ON-time period, at which point it is deactivated and $V_{EMF}$ again monitored to detect when it changes polarity. This sequence of events is continuously repeated to maintain the rotation of the rotor.

The motor is initially set into motion using a start-up routine, which also serves to determine the predetermined ON-time period used during steady-state operation. The start-up routine comprises exciting the coil for a fixed ON time with an excitation voltage having a first polarity, which is then deactivated and $V_{EMF}$ monitored. If $V_{EMF}$ has not changed polarity, the coil is excited again with a voltage of the same polarity, which is again deactivated and $V_{EMF}$ monitored. This is repeated until $V_{EMF}$ changes polarity. Then an excitation voltage having a second polarity opposite the first is applied across the coil for a fixed ON time, after which it is deactivated and $V_{EMF}$ monitored. If $V_{EMF}$ has not changed polarity, the coil is excited again with a voltage of the second polarity, deactivated, and $V_{EMF}$ monitored; this is repeated until $V_{EMF}$ changes polarity. The start-up routine is terminated when the excitation voltage need only be applied for one fixed ON time before $V_{EMF}$ changes polarity.

The present control method and system are suitably used to control DC brushless motors. One possible application for such a motor is to drive a fan blade for a fan designed to cool an integrated circuit.

These and other features, aspects, and advantages of the present invention will become better understood with reference to the following drawings, description, and claims.

DETAILED DESCRIPTION OF THE INVENTION

The present invention is a method and means for determining the position of a brushless DC motor's permanent magnet rotor which is induced to rotate with a stator that includes at least one coil. The method requires that at least one stator coil be excited with a voltage having a first polarity for a given period of time, and then deactivated. The rotor continues to spin because of inertia, and also generates a voltage ($V_{EMF}$) due to EMF in the deactivated coils. $V_{EMF}$ is monitored, and when it changes polarity, the rotor has moved by a known distance with respect to its position at the time of its previous change of polarity. The known distance depends on the number (n) of rotor poles, and is given generally by $(360/n)°$. Thus, for a typical four pole rotor, the known distance is 90°, for an eight pole rotor, the known distance is 45°, etc. At this point, the at least one stator coil is excited with a voltage of a second polarity opposite the first polarity for a given period of time. The coil is again deactivated and $V_{EMF}$ again monitored to detect when it changes polarity. In this way, the position of the rotor can be tracked. The stator coil is connected in a full-bridge configuration. This arrangement enables the excitation voltage to be applied and $V_{EMF}$ to be monitored across the same coil, thereby obviating the need to monitor EMF across a passive coil as in prior art designs.

Figure 1:
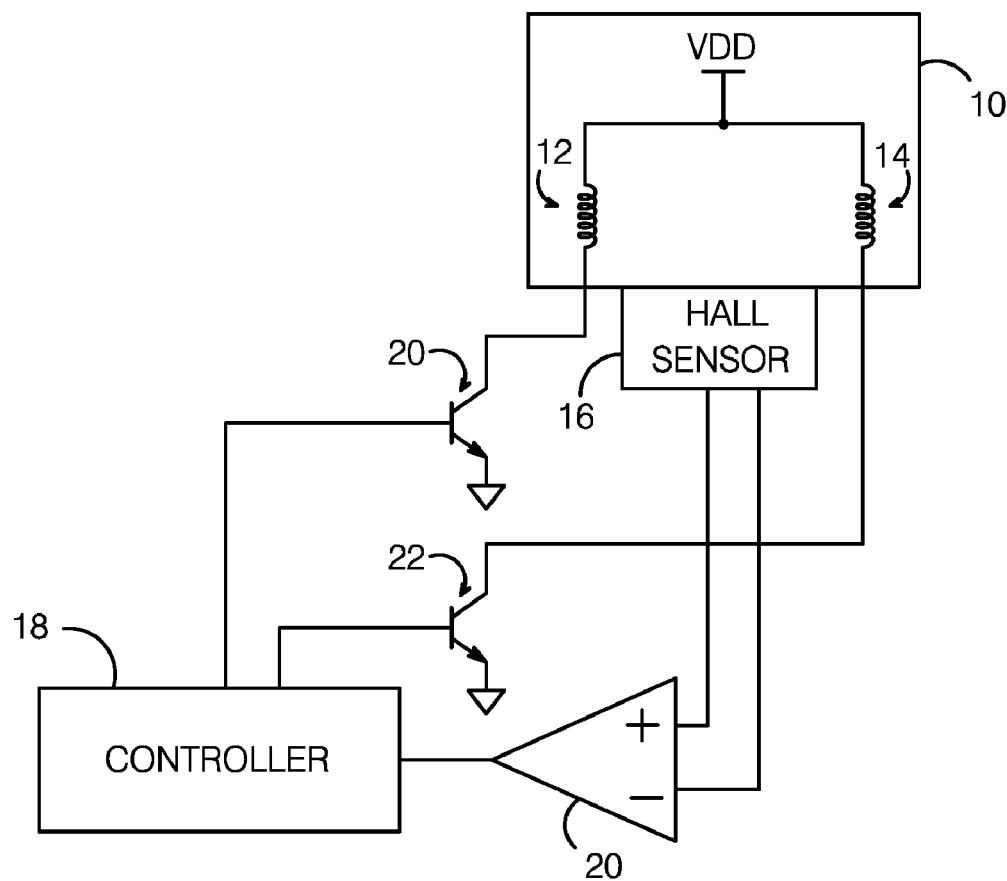
FIG. 1 is block/schematic diagram of a known motor controller.
Figure 2:
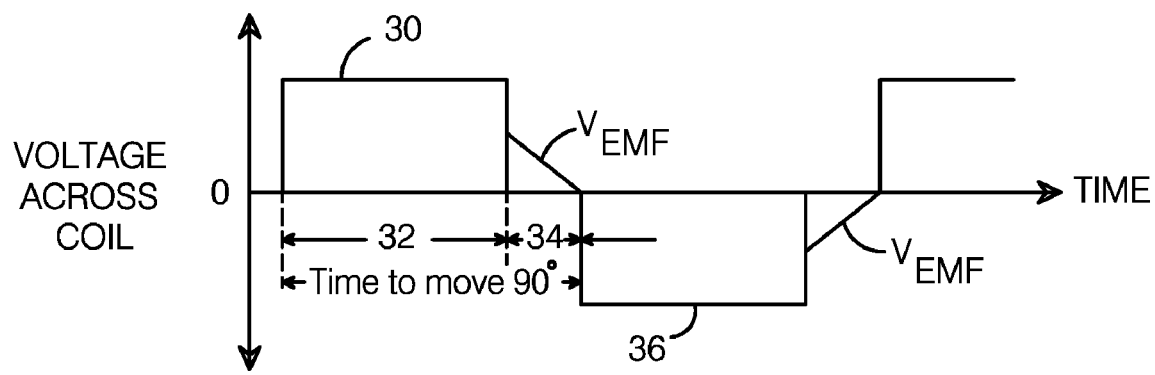
FIG. 2 is a timing diagram illustrating the principles of the sensorless motor control method of the present invention.

This process is illustrated in FIG. 2. An excitation voltage (30) having a first polarity (here, positive) is applied across the coil. After a predetermined "ON" time (32), the coil is deactivated. The voltage across the deactivated coil is that which results from EMF that is induced in the coil by the spinning rotor. This $V_{EMF}$ voltage is monitored while the coil is deactivated (34). When $V_{EMF}$ changes polarity, this indicates that the rotor has moved a known distance since the last change of $V_{EMF}$ polarity was detected; for this example, assume a four pole rotor, and a known distance of 90°.

When a change of $V_{EMF}$ polarity is detected, an excitation voltage (36) having a second polarity (here, negative) is applied across the coil. After a predetermined "ON" time, the coil is deactivated and $V_{EMF}$ monitored. A change in the polarity of $V_{EMF}$ indicates that the rotor has moved another 90°.

To maintain the rotation of the rotor, the sequence of events described above is continuously repeated. By detecting the change in the polarity of $V_{EMF}$, the position of the rotor becomes known, and the timing of the excitation voltage pulses can be properly controlled—without the use of costly Hall sensors as are found in prior art methods.

Figure 3:
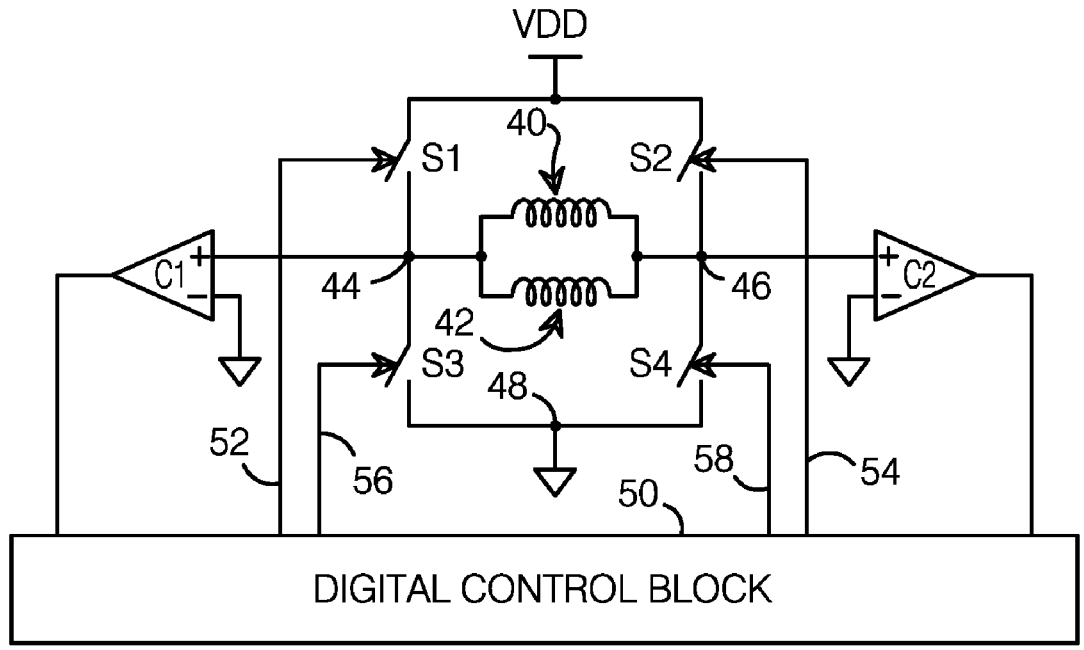
FIG. 3 is a block/schematic diagram of a sensorless motor control system per the present invention.

A basic system for implementing the control method described above is shown in FIG. 3. Here, the stator includes two coils 40, 42 connected in parallel between a node 44 and a node 46. As noted above, the stator coils are connected in a full-bridge configuration: a switching network includes switches S1 and S2 connected between a supply voltage VDD nodes 44 and 46, respectively, and switches S3 and S4 connected between a circuit common point 48 (typically, but not necessarily, ground) and nodes 44 and 46, respectively.

A first comparator C1 has its inputs connected to node 44 and ground, and a second comparator C2 has its inputs connected to node 46 and ground. The outputs of the comparators are provided to a digital control block 50, which provides control signals 52, 54, 56, 58 to operate switches S1, S2, S3 and S4, respectively.

Digital control block is arranged to operate the switches as needed to apply a positive excitation voltage (by closing S1 and S4) or a negative excitation voltage (by closing S2 and S3). When so arranged, the system of FIG. 3 operates as follows:

1. Switches S1 and S4 are turned ON, making current flow from S1 to S4 and generating a positive excitation voltage across coils 40 and 42.
2. After a predetermined ON-time period, switch S1 is turned OFF while S4 remains ON.
3. The $V_{EMF}$ across coils 40 and 42 is monitored by comparator C1; when $V_{EMF}$ changes polarity, the output of C1 toggles, which is detected by digital control block 50.
4. The controller turns switch S4 OFF, and turns switches S2 and S3 ON, thereby generating a negative excitation voltage across coils 40 and 42.
5. After the predetermined ON-time period, switch S2 is turned OFF while S3 remains ON.
6. The $V_{EMF}$ across the coils is monitored by comparator C2 during this OFF-time period; when $V_{EMF}$ changes polarity, the output of C2 toggles, which is detected by digital control block 50.
7. The control block turns S3 OFF and the cycle is repeated from step 1.

Figure 4:
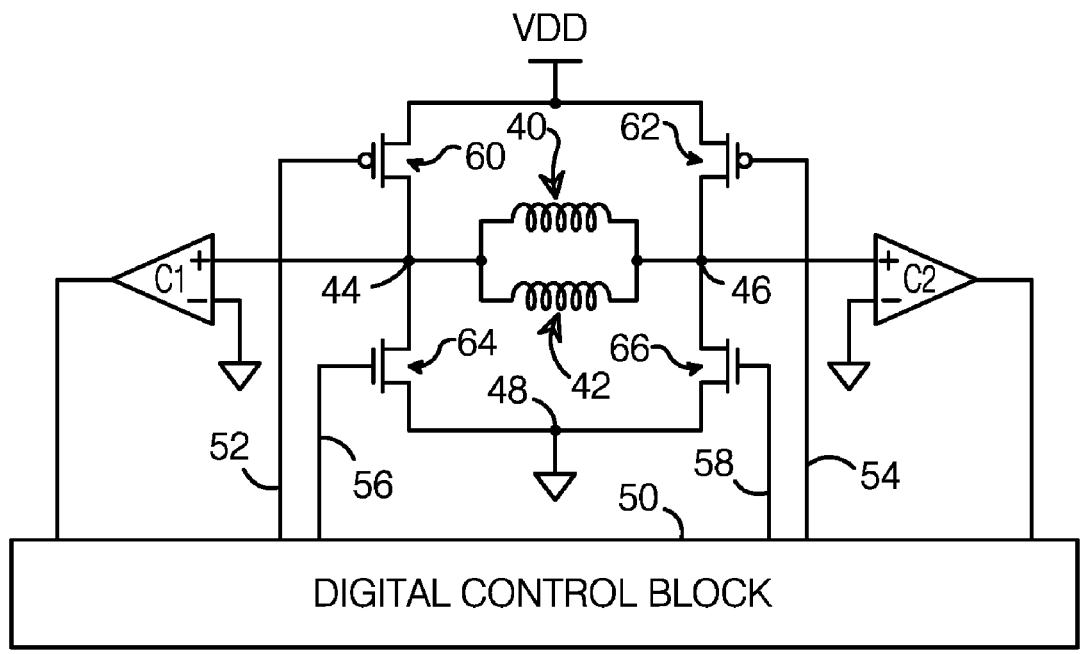
FIG. 4 is a block/schematic diagram of another embodiment of a sensorless motor control system per the present invention.

Switches S1-S4 are preferably implemented with transistors. This is illustrated in FIG. 4, in which S1-S4 are implemented with respective field-effect transistors (FETs) 60, 62, 64, 66.

Figure 5A:
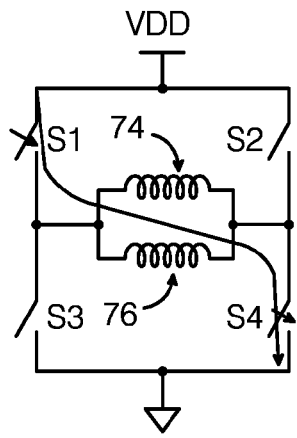
FIG. 5a is a schematic and corresponding plan view of a rotor and stator illustrating the operation of one step of a start-up routine per the present invention.
Figure 5A:
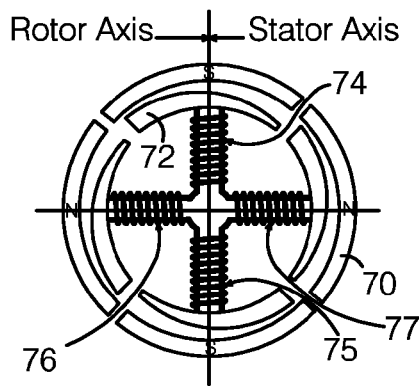
Figure 5B:
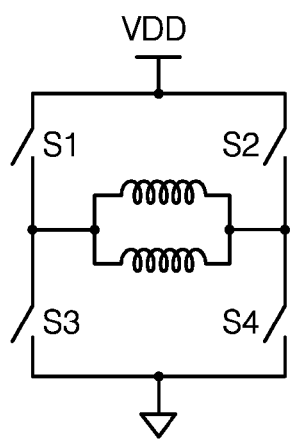
FIG. 5b is a schematic and corresponding plan view of a rotor and stator illustrating the operation of another step of a start-up routine per the present invention.
Figure 5B:
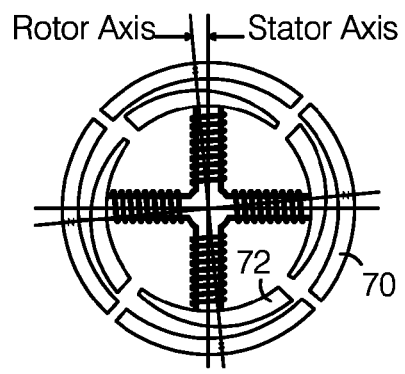
Figure 5C:
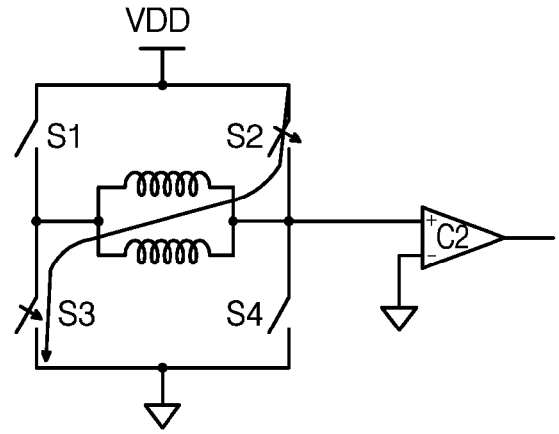
FIG. 5c is a schematic and corresponding plan view of a rotor and stator illustrating the operation of another step of a start-up routine per the present invention.
Figure 5C:
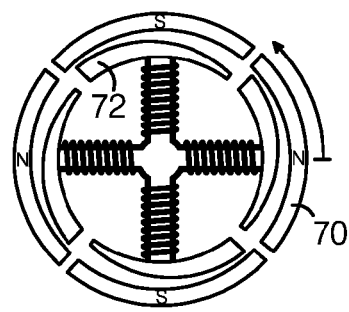
Figure 5D:
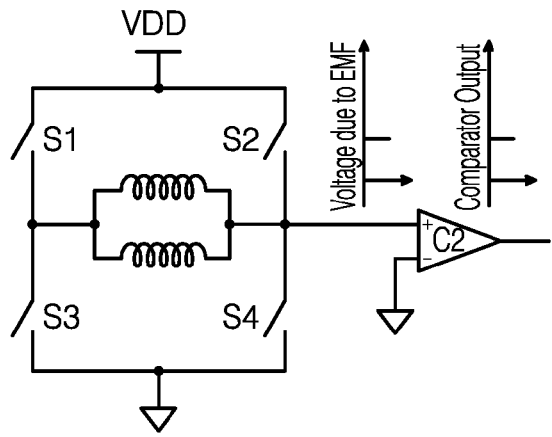
FIG. 5d is a schematic and corresponding plan view of a rotor and stator illustrating the operation of another step of a start-up routine per the present invention.
Figure 5D:
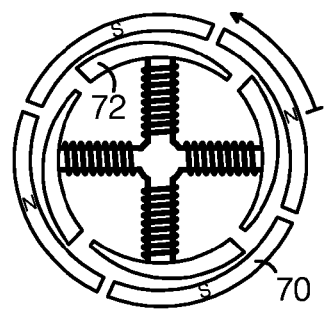
Figure 5E:
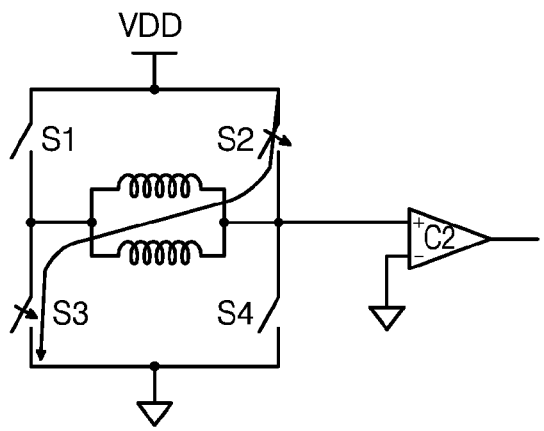
FIG. 5e is a schematic illustrating the operation of another step of a start-up routine per the present invention.
Figure 5F:
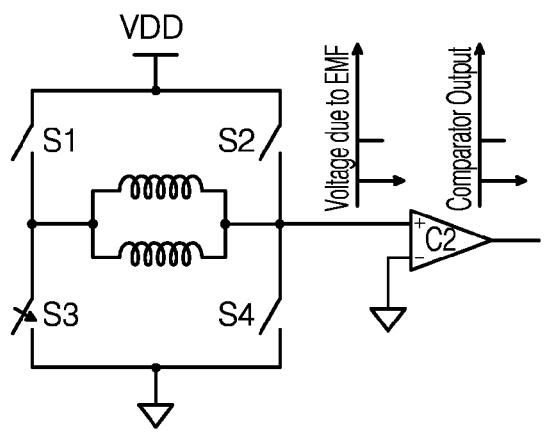
FIG. 5f is a schematic and corresponding plan view of a rotor and stator illustrating the operation of another step of a start-up routine per the present invention.
Figure 5F:
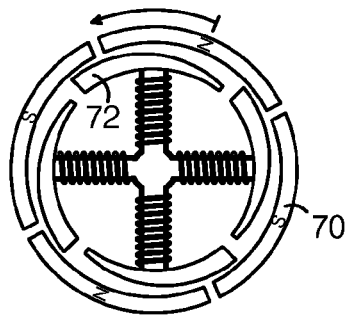
Figure 5G:
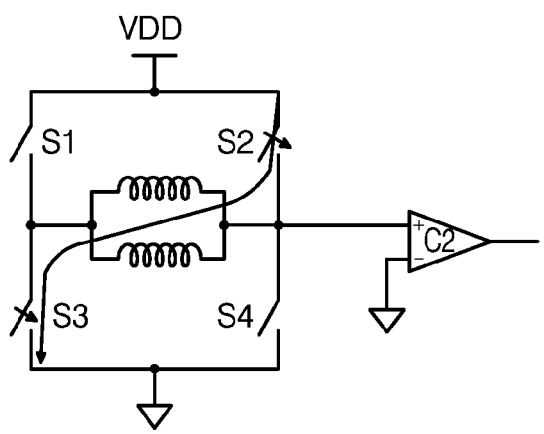
FIG. 5g is a schematic illustrating the operation of another step of a start-up routine per the present invention.
Figure 5H:
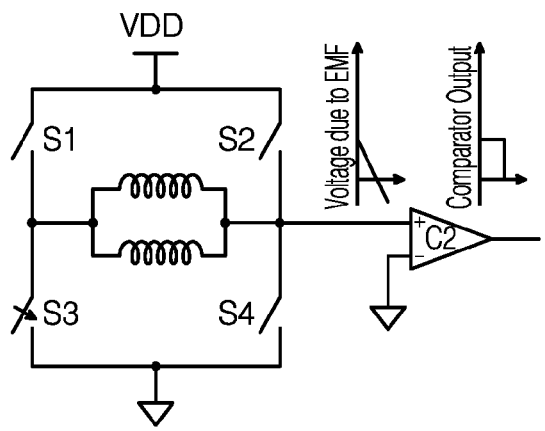
FIG. 5h is a schematic and corresponding plan view of a rotor and stator illustrating the operation of another step of a start-up routine per the present invention.
Figure 5H:
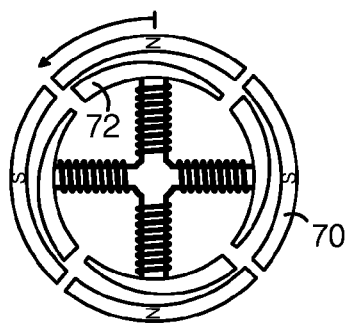

At start-up, the position, direction of rotation and the time taken by the rotor to move 90° (assuming a four pole rotor) is unknown. The present method preferably includes a start-up routine which is used to accelerate the rotor from rest, and to start the rotor spinning in a desired direction. One possible start-up routine is illustrated in FIGS. 5a-5h, which depicts the excitation or deactivation of a multiple-coil stator via switches S1-S4 for each step. The resulting angular relationship between an exemplary rotor 70 and multiple-coil stator 72 is also shown in FIGS. 5a, 5b, 5c, 5d, 5f and 5h (there is no change in angular relationship in FIGS. 5e and 5g), and FIGS. 5d, 5f and 5h depict $V_{EMF}$ and the output of comparator C1 during their respective steps. In this example, first and second coils 74 and 75 lie along a first axis of stator 72, and third and fourth coils 76 and 77 lie along a stator axis which is perpendicular to the first axis. In practice, for both the start-up routine and steady-state operation, all four coils are connected in parallel, and the excitation voltage is applied across all four simultaneously. The rotor shown in FIGS. 5a-5h has two N poles and two S poles; this four pole arrangement causes EMF polarity to change when the rotor moves by 90°.

The start-up routine proceeds as follows:
1. In FIG. 5a, switches S1 and S4 are turned ON, making current flow from S1 to S4 and generating a positive excitation voltage across the stator coils. This forces rotor 70 to become aligned with a coil (here, coil 74) on stator 72.
2. In FIG. 5b, the coils are deactivated for a brief period, during which rotor 70 displaces itself in a "preferred direction of rotation". This is explained in more detail below.
3. In FIG. 5c, switches S2 and S3 are turned on for a fixed ON time, and rotor 70 begins to rotate. Then in FIG. 5d, the fixed ON time expires, S2 is switched OFF, and $V_{EMF}$ is monitored. In this example, rotor 70 has not yet rotated by 90°, so $V_{EMF}$ is positive and the output of C1 has not toggled. If $V_{EMF}$ does not switch polarity during the fixed OFF time, the coil is excited again for the fixed ON time 4. Step 3 is repeated until $V_{EMF}$ switches polarity. For example, as shown in FIGS. 5e and 5f, S2 and S3 are again turned on for a fixed ON time, rotor 70 continues to rotate, the fixed ON time expires and S2 is switched OFF, and $V_{EMF}$ is monitored. However, rotor 70 still has not rotated by 90°, so $V_{EMF}$ remains positive and the output of C1 has not toggled.

5. In FIGS. 5g and 5h, the coils are excited (5g) and then deactivated (5h) and $V_{EMF}$ finally changes polarity, thereby causing the output of comparator C1 to toggle.

6. Steps 3, 4 and 5 are repeated for the opposite direction of the current (not shown), with S1 and S4 turned on for fixed ON time periods such that a negative excitation voltage is repeatedly generated across the coils until $V_{EMF}$ changes polarity.

The fixed ON time is selected so that, when the rotor first begins to turn, more than one excitation pulse is required before $V_{EMF}$ changes polarity. However, as the rotor starts to accelerate, fewer excitation pulses will be required to achieve a change in $V_{EMF}$ polarity. The start-up routine continues as described above until the rotor has picked up enough speed so that only one excitation pulse is needed to effect a change in $V_{EMF}$ polarity. Then, the ON and OFF times of the single excitation pulse are increased or decreased as desired to achieve a desired steady-state motor speed.

Figure 6A:
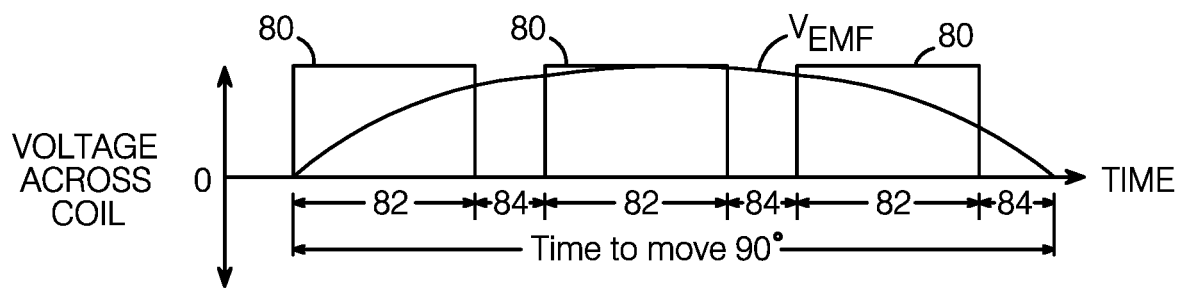
FIG. 6a is a timing diagram illustrating the operation of a portion of a start-up routine per the present invention.

Steps 3, 4 and 5 are illustrated with the timing diagram shown in FIG. 6a. An excitation voltage (80) having a first polarity (here, positive) is applied across the coil. After a fixed "ON" time (82), the coil is deactivated and the $V_{EMF}$ voltage monitored (84). This is repeated until $V_{EMF}$ changes polarity, indicating that the rotor has moved 90° since the last change of $V_{EMF}$ polarity.

Figure 6B:
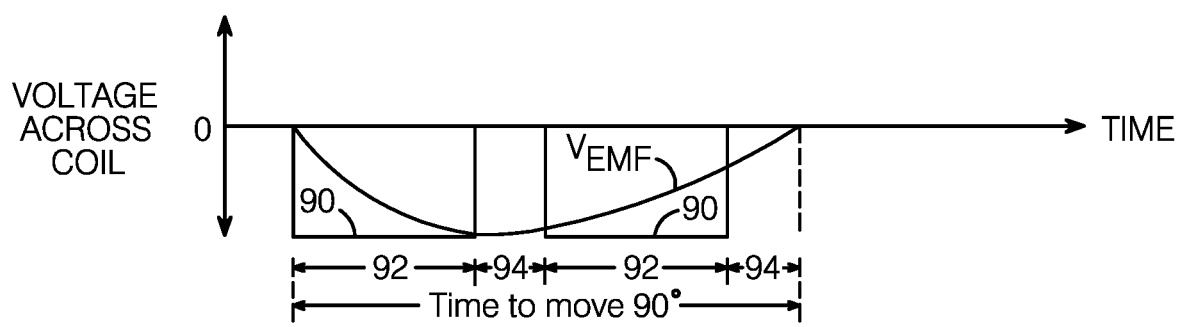
FIG. 6b is a timing diagram illustrating the operation of another portion of a start-up routine per the present invention.

Step 6 is illustrated with the timing diagram shown in FIG. 6b. A negative excitation voltage (90) is applied across the coil. After a fixed "ON" time (92), the coil is deactivated and the $V_{EMF}$ voltage monitored (94). This is repeated until $V_{EMF}$ changes polarity.

Figure 6C:
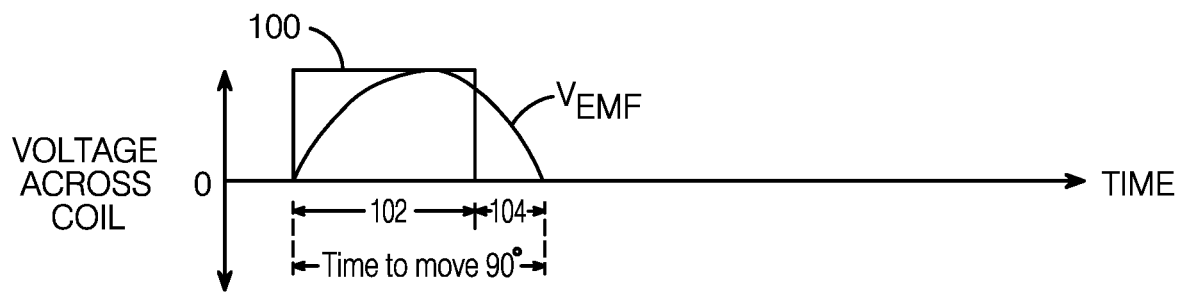
FIG. 6c is a timing diagram illustrating the operation of another portion of a start-up routine per the present invention.

In FIG. 6c, a positive excitation voltage (100) is again applied for a fixed "ON" time (102), after which the coil is deactivated and $V_{EMF}$ monitored (104). Here, only a single excitation pulse was required to effect a change in $V_{EMF}$ polarity, so the start-up routine may terminate. At this point, the ON and OFF times of the single pulse may be increased or decreased as desired to achieve a desired steady-state motor speed. The ON and OFF times of the single pulse required to achieve a desired steady-state motor speed are used to establish the initial predetermined ON and OFF times used during steady-state operation of the motor.

Once steady-state operation is achieved, there are many ways in which a constant rotor speed could be maintained. One possible technique proceeds as follows:

1. During steady-state operation, measure the time taken for the rotor to move 90° (assuming a four pole rotor). Save this time as "T1".
2. Measure the time taken for the rotor to move another 90°. Save this time as "T2".
3. After these initial T1 and T2 values are saved: for every 90° rotation of the rotor, the measured time is saved as T2 and the old T2 is saved as T1. Thus, $T1=T2_{old}$, and $T2_{new}=T_{measured}$. Then, the excitation voltage's predetermined ON time is set equal to 90% of $T2_{new}$, and its OFF time is set equal to 10% of $T2_{new}$.
4. If T2<T1, the motor is accelerating; if T2>T1, the motor is decelerating. To restore a constant rotor speed, the excitation voltage pulse must be adjusted. For example, when it is detected that the motor is accelerating, the ON time can be set equal to 90% of $T2_{new}$–a small fixed value. Similarly, when it is detected that the motor is decelerating, the ON time can be set equal to 90% of $T2_{new}$+a small fixed value. In this way, the rotor speed should be maintained in a narrow range around a desired value.

Note that the methods and/or systems of the present invention could be implemented in many different ways. It is only essential that at least one stator coil be connected in a full-bridge configuration, that an excitation voltage be applied across the coil for a predetermined ON-time period and then deactivated, and that the voltage ($V_{EMF}$) across the coil generated by the EMF induced the coil by the rotor be monitored while the excitation voltage is deactivated to detect when it changes polarity.

Figure 7:
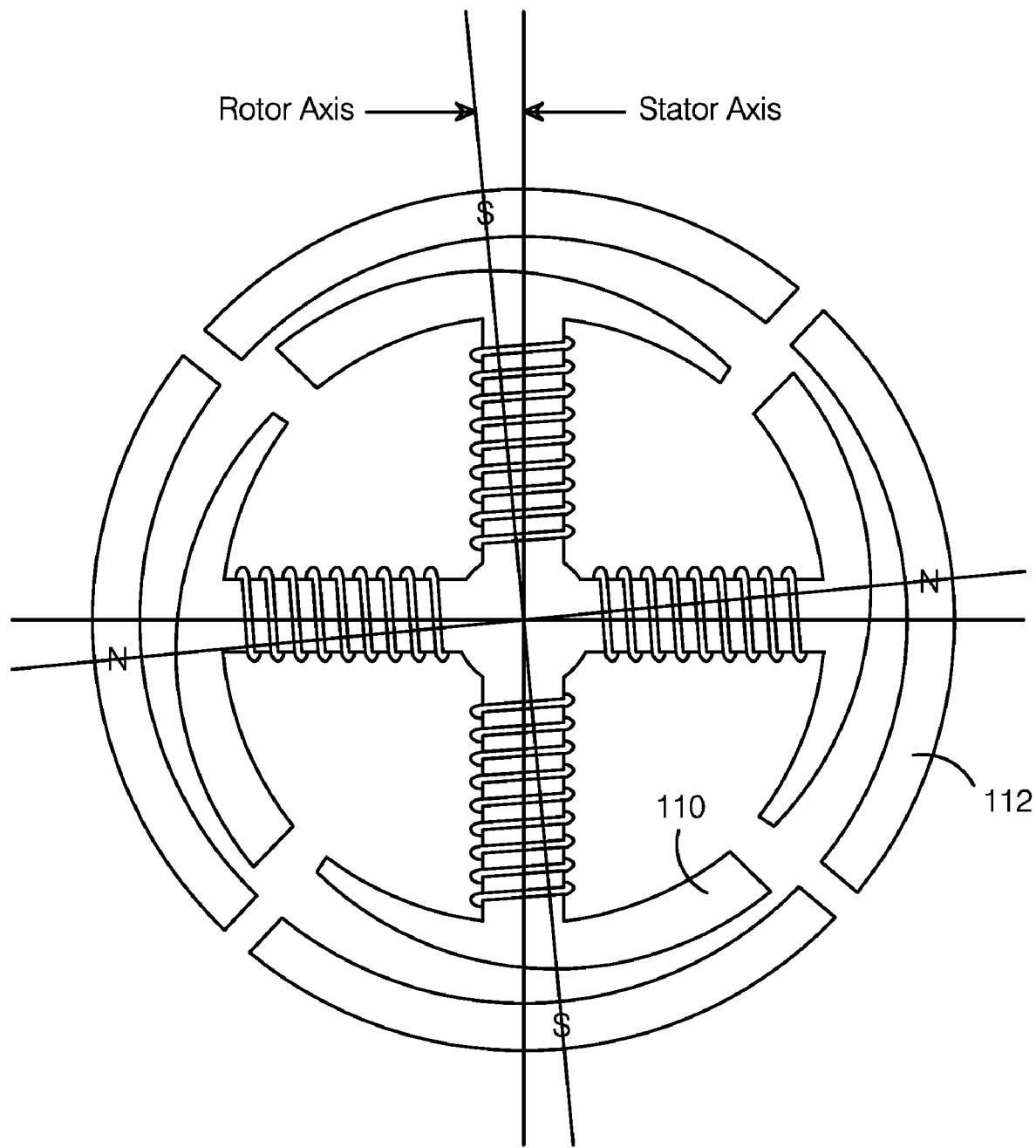
FIG. 7 is a plan view of a rotor and stator in which the stator is formed such that the rotor has a preferred direction of rotation.

In a two-phase motor, it is very difficult to determine the direction of the rotor; hence the physical shape of the stator is preferably changed to have the preferred direction of rotation. One possible stator-rotor design is shown in FIG. 7. The hammer-like shape of the stator 110 ensures that the rotor 112 will move in a particular direction; for the design shown, the preferred direction of rotation is counter-clockwise (CCW). When the stator is not energized, the rotor aligns itself to the stator in such a way that the center of the mass of the stator is closest to the pole of the rotor; i.e., in FIG. 7, instead of aligning perfectly with the stator, the rotor tends to move a little CCW. This misalignment ensures that when the coils are excited, the rotor will tend to move CCW as desired.

A digital control block suitable for realizing the motor control and start-up method described herein could be implemented in many possible ways. One approach is to implement the digital block as a state machine.

The present method has been described as it might be used with multiple stator coils connected in parallel, as would commonly be found on a 2-phase motor. However, the invention could also used with a single coil, with the excitation voltage applied and $V_{EMF}$ measured across the same coil. In this case, no "spare" or second coil is needed. The single coil would lie along one axis of the stator, with a first segment on one side of the stator hub and a second segment on the opposite side of the hub. The two segments would be connected in parallel. Assuming that the coil is initially aligned with two of the rotor's N poles, when an excitation voltage is applied across the coil, it generates an N-N field, forcing the rotor to rotate until the coil is aligned with two of the rotor's S poles, at which point the EMF voltage changes polarity. Applying an excitation voltage of the opposite polarity causes the rotor to move until the coil is again aligned with two of the rotor's N poles. For a four pole rotor, each rotor movement is 90°. If the rotor had, for example, eight poles (with N and S poles alternating around the rotor), the rotor would move 45° each time the excitation voltage polarity was reversed.

The present control method could be used with a variety of DC brushless motor types, which could in turn be used in a wide variety of applications. One possible application is that of a cooling fan designed for mounting on the surface of an integrated circuit.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A method of determining the position of a DC brushless motor's permanent magnet rotor which moves in response to the application of an excitation voltage across the motor's stator coil, comprising:

applying an excitation voltage across at least one stator coil for a predetermined ON-time period;

deactivating said excitation voltage at the end of said predetermined ON-time period;

monitoring the voltage ($V_{EMF}$) across said at least one stator coil generated by the electro-motive force (EMF) induced in said at least one stator coil by said rotor when said excitation voltage is deactivated, said at least one stator coil connected in a full-bridge configuration; and detecting when $V_{EMF}$ changes polarity while said excitation voltage is deactivated, such that said change of polarity indicates when said motor rotor has rotated a known distance with respect to its position at the time of its previous change of polarity.

2. The method of claim 1, further comprising a start-up routine which accelerates said rotor from rest, said start-up routine comprising:

applying an excitation voltage having a first polarity across at least one stator coil for a fixed time period;

deactivating said excitation voltage;

monitoring the voltage ($V_{EMF}$) generated due to electro-motive force (EMF) across said at least one stator coil when said excitation voltage is deactivated; and repeating said applying an excitation voltage, deactivating said excitation voltage, and monitoring $V_{EMF}$ when said excitation voltage is deactivated until $V_{EMF}$ changes polarity, said fixed time period selected such that the application of said excitation voltage across said stator must be repeated more than once before $V_{EMF}$ changes polarity.

3. The method of claim 2, said start-up routine after detecting that $V_{EMF}$ has changed polarity further comprising:

applying an excitation voltage having a polarity opposite said first polarity across said at least one stator coil for a fixed time period;

deactivating said excitation voltage;

monitoring the voltage ($V_{EMF}$) generated due to electro-motive force (EMF) across said at least one stator coil when said excitation voltage is deactivated; and repeating said applying an excitation voltage having a polarity opposite said first polarity, deactivating said excitation voltage, and monitoring $V_{EMF}$ when said excitation voltage is deactivated until $V_{EMF}$ changes polarity.

4. The method of claim 3, wherein said start-up routine further comprises:

repeating said steps of:
applying an excitation voltage having a first polarity;
deactivating said excitation voltage;
monitoring $V_{EMF}$ when said excitation voltage is deactivated;
repeating said applying an excitation voltage, deactivating said excitation voltage, and monitoring $V_{EMF}$ when said excitation voltage is deactivated until $V_{EMF}$ changes polarity;
applying an excitation voltage having a second polarity opposite said first polarity;
deactivating said excitation voltage;
monitoring $V_{EMF}$ when said excitation voltage is deactivated; and
repeating said applying an excitation voltage having a polarity opposite said first polarity, deactivating said excitation voltage, and monitoring $V_{EMF}$ when said excitation voltage is deactivated until $V_{EMF}$ changes polarity;
until said excitation voltage need only be applied once for said fixed period before $V_{EMF}$ changes polarity.

5. The method of claim 2, wherein said motor also comprises a stator, further comprising:

providing said stator such that said rotor has a preferred direction of rotation;

applying an excitation voltage to said at least one stator coil such that said rotor becomes aligned with said at least one stator coil prior to applying said excitation voltage across said at least one stator coil for a fixed time period; and deactivating said excitation voltage such that said rotor displaces itself in said preferred direction of rotation.

6. The method of claim 1, wherein the excitation voltage applied across at least one stator coil has a first polarity, said method after detecting that $V_{EMF}$ has changed polarity further comprising:

applying an excitation voltage having a polarity opposite said first polarity across said at least one stator coil for a predetermined ON-time period;

deactivating said excitation voltage;

monitoring the voltage ($V_{EMF}$) across said at least one stator coil generated by the EMF induced in said at least one stator coil by said rotor when said excitation voltage is deactivated; and detecting when $V_{EMF}$ changes polarity while said excitation voltage is deactivated.

7. The method of claim 6, wherein said steps of applying said excitation voltage of said first polarity, deactivating said excitation voltage, monitoring $V_{EMF}$, detecting when $V_{EMF}$ changes polarity, applying said excitation voltage having a polarity opposite said first polarity, deactivating said excitation voltage, monitoring $V_{EMF}$, and detecting when $V_{EMF}$ changes polarity, are continuously repeated so as to maintain the rotation of said rotor.

8. The method of claim 1, wherein said at least one stator coil consists of a single coil across which said excitation voltage is applied and the $V_{EMF}$ across which is monitored.

9. The method of claim 8, wherein said single coil comprises first and second coil segments which are connected in parallel, said excitation voltage applied across both of said parallel-connected segments simultaneously.

10. The method of claim 1, wherein said at least one stator coil comprises at least two coils connected in parallel across which said excitation voltage is applied and the $V_{EMF}$ across which is monitored.

11. The method of claim 10, wherein each of said at least two coils comprises first and second coil segments which are connected in parallel with each other and with the parallel-connected segments of any other coils, said excitation voltage applied across all of said parallel-connected segments simultaneously.

12. The method of claim 1, wherein said rotor has n poles, and said known distance is $(360/n)°$.

13. A method of applying an excitation voltage across a DC brushless motor's stator coil so as to cause said motor's permanent magnet rotor to rotate and to determine the position of said rotor, comprising:

applying an excitation voltage having a first polarity across at least one stator coil for a predetermined ON-time period;

deactivating said excitation voltage at the end of said predetermined ON-time period;

monitoring the voltage ($V_{EMF}$) across said at least one stator coil generated by the electro-motive force (EMF) induced in said at least one stator coil by said rotor when said excitation voltage is deactivated, said at least one stator coil connected in a full-bridge configuration;

detecting when $V_{EMF}$ changes polarity while said excitation voltage is deactivated, such that said change of polarity occurs when said motor rotor has rotated a known distance with respect to its position at the time of its previous change of polarity;

applying an excitation voltage having a polarity opposite said first polarity across said at least one stator coil for a predetermined ON-time period;

deactivating said excitation voltage;

monitoring the voltage ($V_{EMF}$) generated due to electromotive force (EMF) across said at least one stator coil when said excitation voltage is deactivated;

detecting when $V_{EMF}$ changes polarity, such that said change of polarity occurs when said motor rotor has rotated said known distance with respect to its position at the time of its previous change of polarity; and repeating said steps of applying said excitation voltage of said first polarity, deactivating said excitation voltage, monitoring $V_{EMF}$, detecting when $V_{EMF}$ changes polarity, applying said excitation voltage having a polarity opposite said first polarity, deactivating said excitation voltage, monitoring $V_{EMF}$, and detecting when $V_{EMF}$ changes polarity so as to maintain the rotation of said rotor.

14. The method of claim 13, further comprising a start-up routine which accelerates said rotor from rest, said start-up routine comprises:

repeating said steps of:
applying an excitation voltage having a first polarity across at least one stator coil for a fixed time period;
deactivating said excitation voltage;
monitoring the voltage ($V_{EMF}$) generated due to electromotive force (EMF) across said at least one stator coil when said excitation voltage is deactivated; and
repeating said applying of an excitation voltage, deactivating said excitation voltage, and monitoring $V_{EMF}$ until $V_{EMF}$ changes polarity, said fixed time period selected such that the application of said excitation voltage across said stator must be repeated more than once before $V_{EMF}$ changes polarity;
applying an excitation voltage having a polarity opposite said first polarity across said at least one stator coil for a fixed time period;
deactivating said excitation voltage;
monitoring the voltage ($V_{EMF}$) generated due to electromotive force (EMF) across said at least one stator coil when said excitation voltage is deactivated; and
repeating said applying of an excitation voltage having a polarity opposite said first polarity, deactivating said excitation voltage, and monitoring $V_{EMF}$ until $V_{EMF}$ changes polarity;

until said excitation voltage need only be applied once for said fixed period before $V_{EMF}$ changes polarity.

15. A DC brushless motor control system, comprising:
a means for applying an excitation voltage across at least one coil of a DC brushless motor's stator;
a means for determining the polarity of a voltage ($V_{EMF}$) across said at least one stator coil generated by the electro-motive force (EMF) induced in said at least one stator coil by said motor's permanent magnet rotor when said excitation voltage is deactivated, said at least one stator coil connected in a full-bridge configuration; and
a control block arranged to:
operate said means for applying said excitation voltage such that said excitation voltage is applied across said at least one stator coil for a predetermined ON-time period;
deactivate said excitation voltage at the termination of said predetermined ON-time period; and
determine when $V_{EMF}$ changes polarity, such that said change of polarity occurs when said motor rotor has rotated a known distance with respect to its position at the time of its previous change of polarity.

16. The system of claim 15, wherein the excitation voltage applied across at least one stator coil has a first polarity, said control block after detecting that $V_{EMF}$ has changed polarity further arranged to:
apply an excitation voltage having a polarity opposite said first polarity across said at least one stator coil for a predetermined ON-time period;
deactivate said excitation voltage;
monitor the voltage ($V_{EMF}$) generated due to electro-motive force (EMF) across at least one of said stator coils when said excitation voltage is deactivated; and
detect when $V_{EMF}$ changes polarity, such that said change of polarity occurs when said motor rotor has rotated said known distance with respect to its position at the time of its previous change of polarity.

17. The system of claim 16, wherein said control block is arranged such that said application of said excitation voltage of said first polarity, deactivation of said excitation voltage, monitoring of $V_{EMF}$, detection of when $V_{EMF}$ changes polarity, application of said excitation voltage having a polarity opposite said first polarity, deactivation of said excitation voltage, monitoring of $V_{EMF}$, and detection of when $V_{EMF}$ changes polarity, are continuously repeated so as to maintain the rotation of said rotor.

18. The system of claim 15, wherein said at least one stator coil is connected between first and second nodes, said means for applying said excitation voltage comprising:
a first switch connected between a DC supply voltage and said first node;
a second switch connected between said DC supply voltage and said second node;
a third switch connected between said first node and a circuit common point; and
a fourth switch connected between said second node and said circuit common point;
said control block arranged to close said first and third switches when the excitation voltage applied across said at least one stator coil has said first polarity and to close said second and fourth switches when the excitation voltage applied across said at least one stator coil has said polarity opposite said first polarity.

19. The system of claim 18, wherein said switches are transistors.

20. The system of claim 15, wherein said means for determining the polarity of a voltage across said at least one coil comprises a comparator.

21. The system of claim 15, wherein said at least one stator coil is connected between first and second nodes and said means for determining the polarity of a voltage across said at least one coil comprises:
a first comparator having one of its inputs coupled to said first node and its other input connected to a circuit common point; and
a second comparator having one of its inputs coupled to said second node and its other input connected to said circuit common point;
such that the output of said first comparator toggles when said first node changes polarity and the output of said second comparator toggles when said second node changes polarity.

22. The system of claim 15, wherein said at least one stator coil consists of a single coil across which said excitation voltage is applied and the $V_{EMF}$ across which is monitored.

23. The system of claim 15, wherein said at least one stator coil comprises at least two coils connected in parallel across which said excitation voltage is applied and the $V_{EMF}$ across which is monitored.

24. The system of claim 23, wherein each of said at least two coils comprises first and second coil segments which are connected in parallel with each other and with the parallel-connected segments of any other coils, said excitation voltage applied across all of said parallel-connected segments simultaneously.

25. The system of claim 15, wherein said at least one stator coil consists of a single coil across which said excitation voltage is applied and the $V_{EMF}$ across which is monitored.

26. The system of claim 25, wherein said single coil comprises first and second coil segments which are connected in parallel, said excitation voltage applied across both of said parallel-connected segments simultaneously.

27. The system of claim 15, wherein said rotor has n poles, and said known distance is $(360/n)°$.

28. The system of claim 15, wherein said control block is further arranged to effect a start-up routine which accelerates said rotor from rest, said control place arranged to:
   apply an excitation voltage across at least one stator coil for a fixed time period;
   deactivate said excitation voltage;
   monitor the voltage ($V_{EMF}$) generated due to electro-motive force (EMF) across at least one of said stator coils when said excitation voltage is deactivated; and
   repeat said application of an excitation voltage, deactivation of said excitation voltage, and monitoring of $V_{EMF}$ until $V_{EMF}$ changes polarity, said fixed time period selected such that the application of said excitation voltage across said stator must be repeated more than once before $V_{EMF}$ changes polarity.

29. The system of claim 28, wherein the excitation voltage applied across at least one stator coil during said start-up routine has a first polarity, said control block during said start-up routine further arranged to, after detecting that $V_{EMF}$ has changed polarity:
   apply an excitation voltage having a polarity opposite said first polarity across said at least one stator coil for a fixed time period;
   deactivate said excitation voltage;
   monitor the voltage ($V_{EMF}$) generated due to electro-motive force (EMF) across at least one of said stator coils when said excitation voltage is deactivated; and
   repeat said application of said excitation voltage having a polarity opposite said first polarity, deactivation of said excitation voltage, and monitoring of $V_{EMF}$ until $V_{EMF}$ changes polarity.

30. The system of claim 29, wherein said control block is further arranged to repeatedly:
   apply an excitation voltage having a first polarity across at least one stator coil for a fixed time period;
   deactivate said excitation voltage;
   monitor the voltage ($V_{EMF}$) generated due to electro-motive force (EMF) across said at least one stator coil when said excitation voltage is deactivated;
   repeat said applying of an excitation voltage, deactivating said excitation voltage, and monitoring $V_{EMF}$ until $V_{EMF}$ changes polarity;
   apply an excitation voltage having a polarity opposite said first polarity across said at least one stator coil for a fixed time period;
   deactivate said excitation voltage;
   monitor the voltage ($V_{EMF}$) generated due to electro-motive force (EMF) across said at least one stator coil when said excitation voltage is deactivated; and
   repeat said applying of an excitation voltage having a polarity opposite said first polarity, deactivating said excitation voltage, and monitoring $V_{EMF}$ until $V_{EMF}$ changes polarity;
   until said excitation voltage need only be applied once for said fixed period before $V_{EMF}$ changes polarity.

31. The system of claim 15, wherein said stator has a preferred direction of rotation, said control block further arranged to:
   apply an excitation voltage to said at least one stator coil such that said rotor becomes aligned with said at least one stator coil prior to the application of said excitation voltage across said at least one stator coil; and
   deactivate said excitation voltage such that said rotor displaces itself in said preferred direction of rotation.

32. The system of claim 31, wherein said stator comprises multiple stator segments each of which has a hammer-like shape, such that the rotor aligns itself to the stator in such a way that the center of the mass of the stator is closest to the pole of the rotor.

33. The system of claim 31, further comprising a fan blade coupled to said rotor thereby forming a motor-driven fan.

34. A DC brushless motor control system, comprising:
   a means for applying an excitation voltage across at least one coil of a DC brushless motor's stator;
   a means for determining the polarity of a voltage ($V_{EMF}$) across said at least one stator coil generated by the electro-motive force (EMF) induced in said at least one stator coil by said motor's permanent magnet rotor when said excitation voltage is deactivated, said at least one stator coil connected in a full-bridge configuration; and
   a control block arranged to:
      operate said means for applying said excitation voltage such that said excitation voltage has a first polarity and is applied across said at least one stator coil for a predetermined ON-time period;
      deactivate said excitation voltage at the termination of said predetermined ON-time period;
      determine when $V_{EMF}$ changes polarity, such that said change of polarity occurs when said motor rotor has rotated a known distance degrees with respect to its position at the time of its previous change of polarity;
      operate said means for applying said excitation voltage such that said excitation voltage has a polarity opposite said first polarity and is applied across said at least one stator coil for a predetermined ON-time period;
      deactivate said excitation voltage at the termination of said predetermined ON-time period; and
      determine when $V_{EMF}$ changes polarity, such that said change of polarity occurs when said motor rotor has rotated said known distance with respect to its position at the time of its previous change of polarity;
   said control block arranged such that said application of said excitation voltage of said first polarity, deactivation of said excitation voltage, detection of when $V_{EMF}$ changes polarity, application of said excitation voltage having a polarity opposite said first polarity, deactivation of said excitation voltage, and detection of when $V_{EMF}$ changes polarity, are continuously repeated so as to maintain the rotation of said rotor.

35. The system of claim 34, wherein said control block is further arranged to effect a start-up routine which accelerates said rotor from rest, said control place arranged to repeatedly:

apply an excitation voltage having a first polarity across at least one stator coil for a fixed time period;

deactivate said excitation voltage;

monitor the voltage ($V_{EMF}$) generated due to electro-motive force (EMF) across at least one of said stator coils when said excitation voltage is deactivated;

repeat said application of an excitation voltage, deactivation of said excitation voltage, and monitoring of $V_{EMF}$, until $V_{EMF}$ changes polarity, said fixed time period selected such that the application of said excitation voltage across said stator must be repeated more than once before $V_{EMF}$ changes polarity;

apply an excitation voltage having a polarity opposite said first polarity across said at least one stator coil for a fixed time period;

deactivate said excitation voltage;

monitor the voltage ($V_{EMF}$) generated due to EMF across at least one of said stator coils when said excitation voltage is deactivated;

repeat said application of said excitation voltage having a polarity opposite said first polarity, deactivation of said excitation voltage, and monitoring of $V_{EMF}$ until $V_{EMF}$ changes polarity, said fixed time period selected such that the application of said excitation voltage having a polarity opposite said first polarity across said stator must be repeated more than once before $V_{EMF}$ changes polarity;

until said excitation voltage need only be applied once for said fixed period before $V_{EMF}$ changes polarity.

\* \* \* \* \*